United States Patent
Birks et al.

(10) Patent No.: US 7,093,275 B2
(45) Date of Patent: Aug. 15, 2006

(54) SYNCHRONIZING SERVICES ACROSS OPEN CABLE AND PACKET CABLE

(75) Inventors: David A. Birks, New Egypt, NJ (US); So Vang, Broomfield, CO (US); David Broberg, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1166 days.

(21) Appl. No.: 09/845,431

(22) Filed: Apr. 30, 2001

(65) Prior Publication Data

US 2002/0162122 A1    Oct. 31, 2002

(51) Int. Cl.
*H04N 7/173* (2006.01)
*H04N 5/04* (2006.01)
*H04B 7/212* (2006.01)
*H04J 3/06* (2006.01)
*H04N 7/10* (2006.01)
*H04N 7/16* (2006.01)

(52) U.S. Cl. .................. 725/105; 725/32; 725/136; 725/139; 348/500; 370/324; 370/503

(58) Field of Classification Search .................. 725/32, 725/109, 131, 139, 151, 136, 105; 348/500, 348/423.1, 425.4; 709/218, 219; 370/324, 370/395.1, 395.62, 503
See application file for complete search history.

(56) References Cited

U.S. PATENT DOCUMENTS

| | | | | |
|---|---|---|---|---|
| 6,324,694 | B1 * | 11/2001 | Watts et al. | 725/32 |
| 6,487,543 | B1 * | 11/2002 | Ozaki et al. | 725/112 |
| 6,493,872 | B1 * | 12/2002 | Rangan et al. | 725/32 |
| 6,530,084 | B1 * | 3/2003 | Del Sesto et al. | 725/61 |

* cited by examiner

*Primary Examiner*—Chris Kelley
*Assistant Examiner*—Joseph G. Ustaris
(74) *Attorney, Agent, or Firm*—Cochran Freund & Young LLC; William W. Cochran

(57) ABSTRACT

Disclosed is a system and that synchronizes utilization of a data transfer with an audio/video stream. Time information contained within an audio/video stream is monitored for a specified time at which a data transfer may be combined with the audio/video stream. Combination includes logical operations, arithmetic operations, and may include screen windowing or other operations. Time required to request and receive a data transfer may be monitored or estimated such that requests for data are issued in advance of utilization of the data, allowing for data transfer time and network access time or other factors. Requests for a data transfer may be processed employing user information such that returned data transfers reflect a characteristic of the user.

7 Claims, 3 Drawing Sheets

SYNCHRONIZING SERVICES ACROSS OPEN CABLE AND PACKET CABLE

BACKGROUND OF THE INVENTION a. Field of the Invention

The present invention pertains generally to digital data transferred over a network in conjunction with video or audio data and more specifically to synchronization of data transferred over a network with video or audio data transferred on that network or on an independent network or channel.

b. Description of the Background

Television and audio broadcast may employ a range of broadband media including cable, satellite and high speed Internet. The term broadband refers to the capability of the media or network to carry multiple channels at one time. Video and audio programs are typically allocated a constant bandwidth such that dropouts or distorted output is not produced. A channel that provides a constant minimum bandwidth rate may be referred to as isochronous or as a constant bit rate (CBR) channel. Other services that transfer data on the network, such as Internet, have typically been asynchronous, wherein bandwidth may vary depending on network load. New standards are emerging that provide for isochronous transfer of data on a network. Such standards include voice over DSL (Digital Subscriber Line) and DOCSIS (Data Over Cable System Interface Specification) and more specifically by PacketCable that provides a method for isochronous data transfers over cable.

The advent of isochronous data transfer over broadband networks enables streaming audio and video programs other than those provided by a cable or television operator. Additionally, isochronous data transfers allow the possibility for data from one channel to be synchronized with an audio/video broadcast stream or with data from another channel. Synchronized data transfer may be employed to provide modification and enhancement of a broadcast program. For example, subtitles in a number of spoken languages, or sign language, may be added to televised programs. Such additions are outside the capabilities of captioning facilities of televisions. Additionally, synchronized data transfers may be used to add local content to advertising, such as local automobile dealer information presented in conjunction with a national automobile advertisement. Data transfers must be synchronized in some manner such that subtitles appear at the correct time or advertising message enhancements appear at the correct time. Synchronized data transfers utilized in conjunction with an audio/video stream may provide increased viewer enjoyment and may provide additional opportunities for revenue. As such, a new method is needed to control the transfer of data and the utilization of that data in synchrony with an audio/video stream or data from another channel.

SUMMARY OF THE INVENTION

The present invention overcomes the disadvantages and limitations of the prior art by providing a system and method wherein data transferred over an isochronous channel may be synchronized with an audio or video stream. Time information contained within an audio or video stream, such as an MPEG audio/video stream, is employed to synchronize the utilization of data from the isochronous channel. MPEG formats are employed in cable, satellite, DVD and other systems. Information describing the stream, time and nature of combination with a data transfer may be contained within the audio/video stream, the data transfer, or may be supplied by other methods.

The present invention may therefore comprise a method for synchronizing data transfer with an audio/video stream comprising: receiving an audio/video stream; receiving a data transfer including a descriptor of when the data transfer may be combined with the audio/video stream; obtaining time information from the audio/video stream; and combining the data transfer and the audio/video stream when the time information is in substantial agreement with the descriptor.

The invention may further comprise a system for combining a data transfer with an audio/video stream comprising: a video server; a data server; a client system operable to receive the audio/video stream from the video server and the data transfer from the data server; a network management component operable to provide isochronous data transfer from the data server to the client system; and a processing component in the client system operable to monitor the audio/video stream for time information and to combine the data transfer with the audio/video stream.

Latencies incurred between requests for data and reception of data over the channel may be measured and the time at which data is requested may be adjusted in order to minimize local memory requirements. Advantages of the present invention include the ability to overlay images from a data transfer with an audio/video stream. Such overlays may be used for advertising, entertainment or education. Advertising may employ an overlay to identify products for sale in a video image, or to display a product ordering menu or product information. An entertainment application may employ the present invention to combine an audio/video stream, used for background images, with a data transfer used to overlay game characters or other images. Further, the invention may be employed to display a musical score or other information such as guitar chords when a musical audio/video stream is presented. In addition, the present invention allows personalization of advertising at the customer level whereas other personalization methods are often implemented at the broadcast site, limiting the number of versions that may be produced. In other words, the present invention allows modification of an audio/video stream by the client system in contrast to methods where modification is performed by a server at the head end of a cable or satellite system and is therefore limited by the number of broadcast channels.

Further yet, the synchronization of data transfers and an audio/video stream may be employed to reduce processing requirements of a client system for television based advertising and purchasing. A client system may be a set top box, satellite receiver or personal computer, or other system capable of networking and audio/video output. In contrast to executing menu software on a client system, the system of the present invention may be employed to return audio/video stream identification, frame number, and mouse click position from the client system to a server. The server then may generate menus, product information, or other displays and transfer them to the client system for combination with an audio/video stream.

Further advantages of the present invention include that an audio/video presentation need not be modified to include markers or triggers, as is the case for ATVEF (Advanced Television Enhancement Foundation). By using timing information already contained in a broadcast or streaming presentation, the present invention allows greater flexibility in content enhancement.

DETAILED DESCRIPTION OF THE INVENTION

Figure 1:
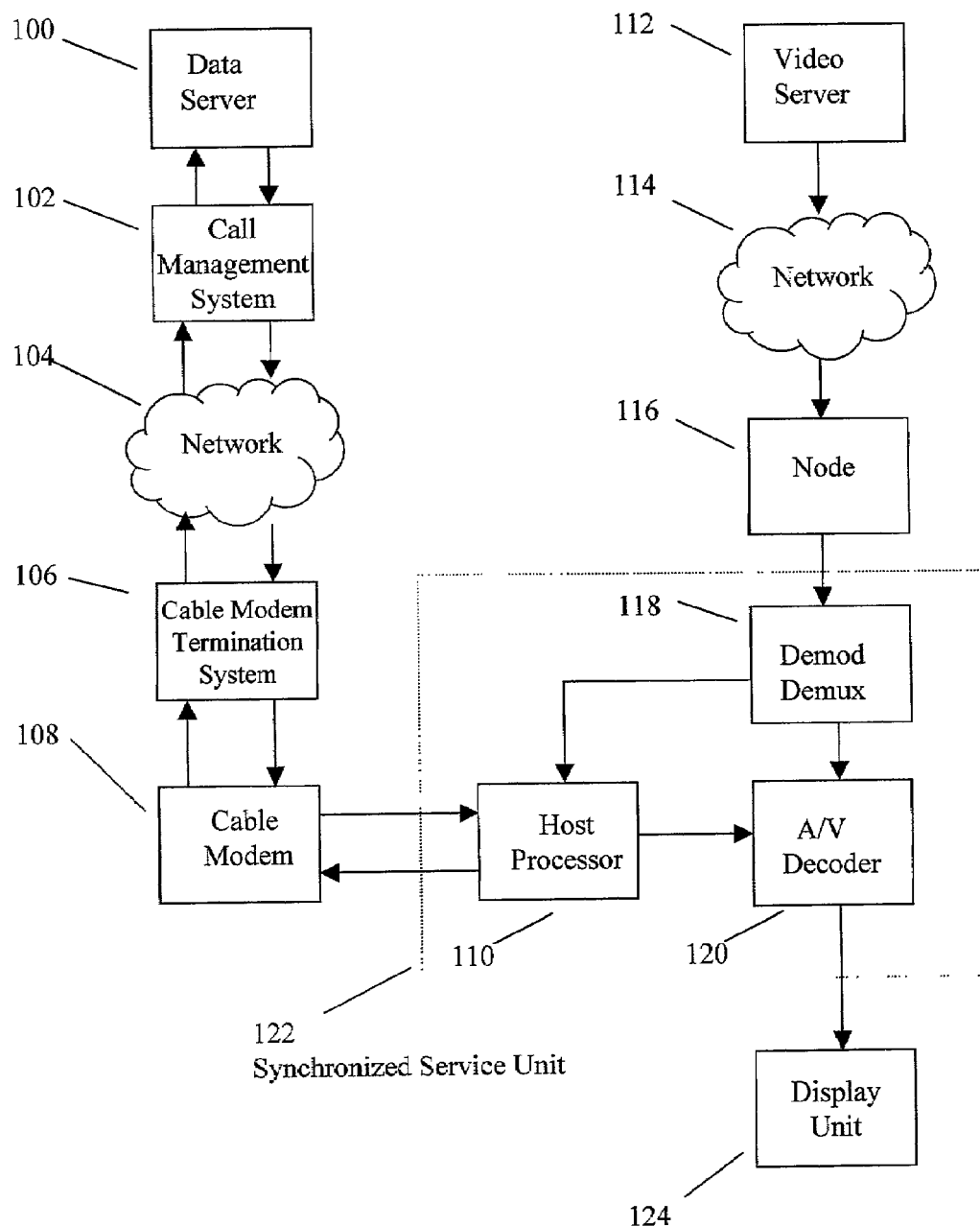
FIG. 1 is a system overview block diagram.

The present invention provides a system and method for the transfer of data and use of the data in synchrony with an audio/video stream. Data transfers may be on a separate channel or network and may employ protocols as defined by DOCSIS (Data Over Cable System Interface Specification) versions including PacketCable or other standards such that the network or channel provides isochronous data transfer.

An audio/video stream may be in MPEG-2 format, as may be used in satellite and digital cable television systems. MPEG-2 employs data packets of 188 bytes each. At the start of each packet is a package identifier (PID). There are four types of PIDs used by satellite receivers. A VPID is the PID for the video stream and an APID is the PID for an audio stream. A PCR PID (program clock reference) may be used to synchronize the video and audio packets. Clock reference data is often embedded into the video stream. The present invention may employ timing information from the PCR PID or the timing information contained within the video stream or audio stream to synchronize utilization of transferred data. A fourth PID is the System Information PID and may be used for data such as a program guide, and information about other frequencies. In one embodiment of the present invention, the System Information PID may be employed to indicate that data is available in conjunction with the present audio/video stream.

Data transfers may be broadcast in conjunction with a program, or may be transferred in response to a request from a client system, such as a set top box, satellite receiver, or personal computer. A software program in the client system controls the utilization of data transfers with an audio/video stream. When data transfers are broadcast in conjunction with an audio/video stream, the data transfers may contain information that identifies the audio/video stream with which the data may be utilized, and the time at which the data may be utilized. Further, the data transfer may contain information describing data type and how the data is to be used. For example, a broadcast data transfer containing names of local automobile dealers to be used in conjunction with an advertising message may include a descriptor that text data of a predetermined font size is to be overlaid at a specified position on the display screen. Further, information contained within the data transfer or audio/video stream may define the type of combination to be performed between the transferred data and the audio/video stream. The combination may employ a number of methods including logical operations, blending, or conditional combination, for example. Further, combination may include windowing wherein information from an audio/video stream may be placed in a window and information generated using a data transfer may be placed in another window or combination of windows. Combination may be performed using digital data in a display memory or may employ analog signal mixing.

As previously mentioned, data transfers may be broadcast in conjunction with a program, or may be transferred in response to a request from a client system. When data transfers are performed in response to a request from a client system, the client system may include methods to estimate or measure the amount of time required to establish a connection and receive a data transfer. Advantageously, these methods may reduce the amount of memory needed in the client system to save data transfers prior to utilization. A software program in the client system may contain downloaded information describing which audio/video streams may have associated data transfers. The downloaded information may be received as part of a data transfer employing an isochronous data channel or may be transferred by other methods such as an asynchronous Internet connection. Alternately, an audio/video stream may contain information indicating that a data transfer may be utilized with the audio/video stream.

FIG. 1 is a system overview block diagram. Data server 100 employs call management system 102 to transfer data across network 104. Call management system 102 comprises isochronous data transfer management such as may also be utilized for voice data transfers. Call management system 102 employs any protocol that supports isochronous data transfers and is not restricted to any particular network or data format. Call management system 102 may comprise components from Cisco CallManager (CCM) software product available from Cicso Systems, a company located at 170 West Tasman Dr., San Jose, Calif. 95134 USA. Network 104 is connected to cable modem termination system 106 and to data server 100. Network 104 supports bi-directional data transfers and may comprise fiber optic cable, coaxial cable, or other media. Cable modem termination system 106 may be implemented using a BSR 64000 broadband services router from RiverDelta Networks that has corporate offices located at 3 Highwood Drive Tewksbury, Mass. 01876. The aforementioned unit supports DOCSIS and data rate controlled transfers such as PacketCable. The cable modem termination system provides a quality of service (QoS) level wherein isochronous data transfer is supported. Cable modem termination system 106 may support many simultaneous cable modem users on a single TV channel. If support for more cable modems is desired, additional channels may be added to cable modem termination system 106.

Cable modem 108 communicates with cable modem termination system 106 and with host processor 110. Cable modem 108 is a modem (modulator/demodulator) that communicates across cable television cable. Cable modem 108 may be an internal or external cable modem, as may be employed with personal computers, or may be part of an interactive set top box. An internal cable modem, or a cable modem that is part of an interactive set top box, communicates data through the system's internal bus. An external cable modem may employ Ethernet or USB (Universal Serial Bus) to transfer data between the modem and the system.

Synchronized service unit 122 comprises demodulator demultiplexer 118, host processor 110 and A/V decoder 120. Synchronized service unit 122 may be part of a set top box, satellite receiver or personal computer. Host processor 110 may comprise a CPU, program memory and system memory. Host processor 110 is operable to send and receive data to and from data server 100, to process data in system memory, and to output processed data to A/V decoder 120. Demodulator demultiplexer unit 118 may be typical of that found in a cable set top box receiver and may comprise an A/D converter, QAM-64/256 demodulator, MPEG frame synchronization, and Reed Solomon error correction for receive operations. Demodulator demultiplexer unit 118 serves as a tuner, receiving information contained within a frequency range. Information supplied by demodulator demultiplexer unit 118 to host processor 110 and A/V decoder 120 may comprise MPEG data, control or other information. Host processor 110 may process information from demodulator demultiplexer 118, possibly employing data received from data server 100, and supply processed information to A/V decoder 120, or, host processor 110 may allow information from demodulator demultiplexer 118 to pass directly to A/V decoder 120.

As shown in FIG. 1, video server 112 transfers data through network 114 to node 116. Video server 112 may comprise a server and a cable headend unit such as the uBR7200 from Cisco Systems. Network 114 may comprise a fiber optic network. Fiber optic cable may be employed to carry a signal from a cable television operator's studio or production facilities to nodes located in or near viewer neighborhoods. Node 116 may provide signal amplification and signal distribution to demodulator demultiplexer unit 118. Node 116 is an addressable unit in a network and may comprise a computer, workstation, or a communications control unit. Video server 112, network 114 and node 116 are publicly available components known to cable television broadcast system experts. The connection between node 116 and demodulator demultiplexer 118 may be coaxial cable.

Demodulator demultiplexer unit 118 supplies signals to host processor 110 and to A/V decoder 120. As noted previously, host processor 110 may process information from demodulator demultiplexer 118 and data from cable modem 108 to produce processed information that is sent to A/V decoder 120. Processing by host processor 110 may include combining audio and video information and scaling of images. For example, host processor 110 may vertically compress a video image to produce a banner area at the bottom of the screen, and then display information from the cable modem 108 in the banner area. Further, host processor may be employed to parse information from demodulator demultiplexer 118 and selectively replace data with data from cable modem 108. For example, audio information received by demodulator demultiplexer 118 may be replaced with audio information received by cable modem 108, thereby allowing output of a foreign language, or language corresponding to a selected audience rating. The information transferred from host processor 110 to A/V decoder 120 may be MPEG data, bitmap data, or data in other formats.

A/V 120 decoder may support analog or digital signal inputs, or both. Output from A/V decoder 120 may be in formats such as composite video, S-video, RGB, and component audio. Output from A/V decoder 120 may be supplied to display unit 124 which may comprise a television, computer monitor or other display device. Alternatively, output from A/V decoder 120 may be supplied to a recording device such as a video tape recorder, for example. In an alternate embodiment, A/V decoder 120 may include processing functions such as overlay and windowing, for example, such that the images and audio provided to display unit 124 are processed in part by host processor 110 and may be processed in part by A/V decoder 120. A/V decoder may comprise MPEG decoding circuitry, a frame buffer, and circuitry supporting other functions such as windowing, menu display, captioning and other functions, for example.

Figure 2:
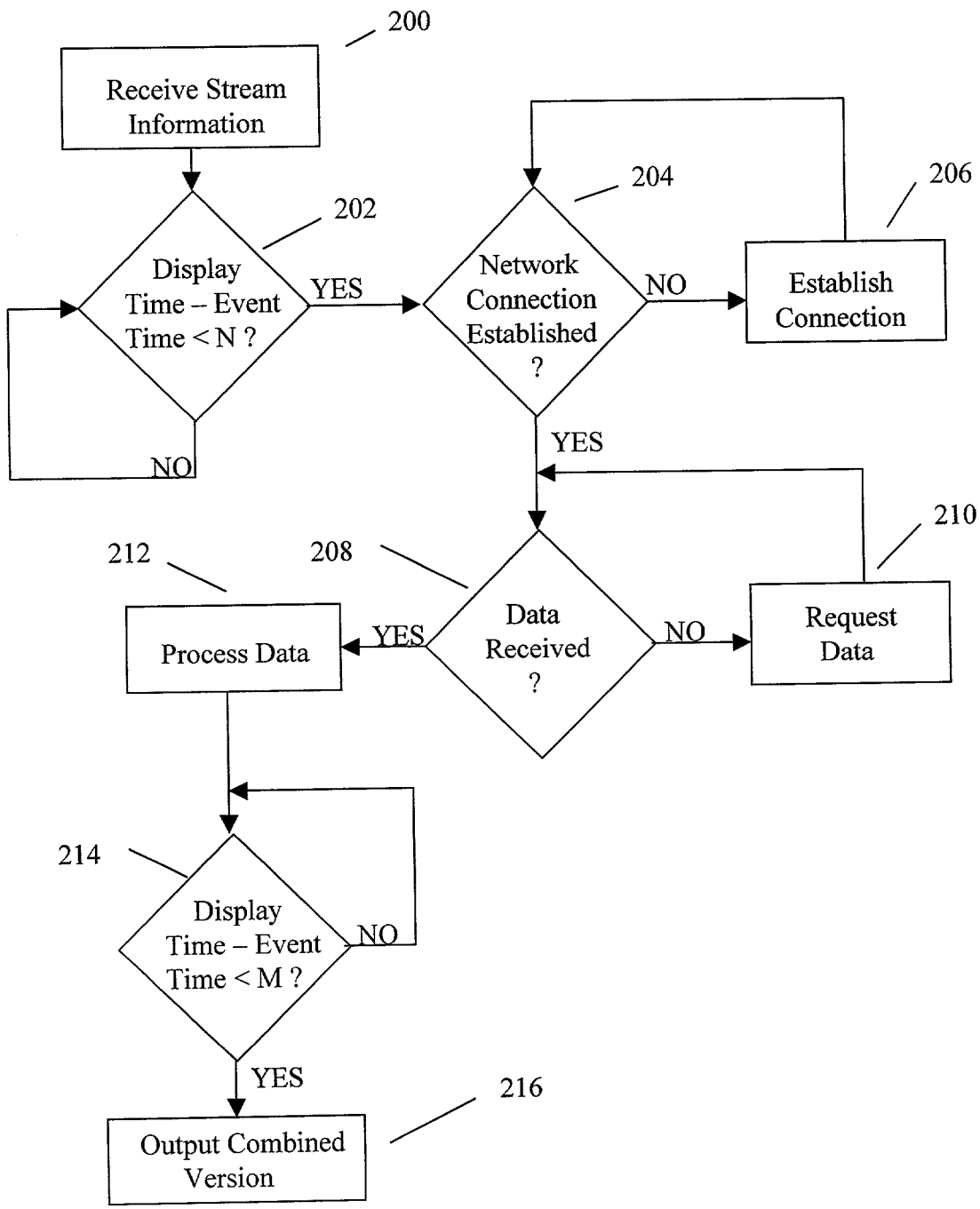
FIG. 2 depicts a flowchart for synchronizing downstream data transfers with an audio/video stream.

FIG. 2 depicts a flowchart for synchronizing data transfers with an audio/video stream. At step 200, information is received that identifies an audio/video stream for which a data transfer will be available. This information may be contained within an audio/video stream or may be provided by another channel or Internet connection. The information may contain a descriptor to identify the audio/video stream and a time at which a data transfer may be combined with the audio/video stream. Step 202 waits until the display time of the audio/video stream is within a predetermined period, N, of the time at which the data transfer may be combined. In a digital video system, step 202 may employ checking of PCR (Program Clock Reference) or PTS (Program Time Stamp), queue points or other information within an MPEG stream. In an analog system, step 202 may employ checking of information contained within the vertical blanking interval to determine the display time at which data may be combined. Further, a count may be established from information contained within the blanking interval and the count may be incremented for each vertical blanking interval, thereby establishing an indicator of the display time of the presentation, such that step 202 may wait until the indicator of display time is within a predetermined period N, of the time at which a data transfer may be combined with the audio/video stream. Maintaining an indicator of the display time of a presentation allows for situations where frame time information may be provided in some but not all blanking intervals. Step 204 checks if a network connection has been established. If the result of step 204 is that a network connection is not established, step 206 establishes a network connection. Step 208 checks to see if data to be combined with the audio/video stream has been received. If step 208 determines that data has not been received, step 210 requests data. The predetermined period, N, of step 202 may be established such that there is sufficient time to establish a network connection, request and receive data, plus to perform processing of the data. Step 212 processes data transfers. Processing may include the rendering of fonts, expansion of compressed data or other operations. Step 214 waits until the display time of the audio/video stream is within a specified period, M, of the time at which the data transfer may be combined with the audio/video stream. M may be selected to allow for pipeline processing duration or buffer access and processing times. Step 216 combines the processed data with the audio/video stream and outputs the result to a television, personal computer or other device. Data may include control function information that a set top box, satellite receiver, or personal computer is responsive to. Control function information may alter the output of an audio/video stream such as displaying the video in a smaller window, controlling audio or video effects, or other functions.

Figure 3:
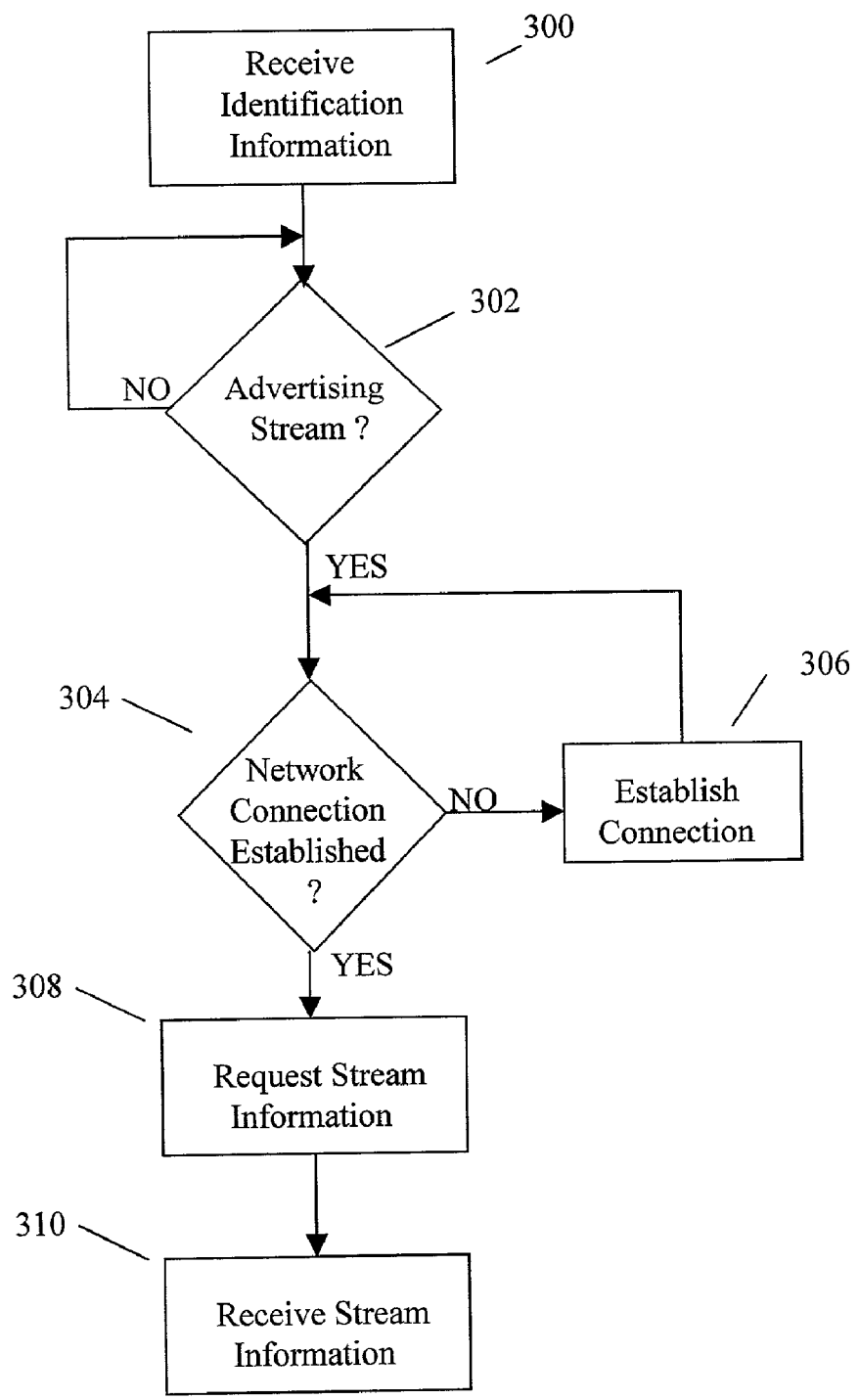
FIG. 3 depicts a flowchart for personalizing data transfers utilized with an audio/video stream.

FIG. 3 depicts a flowchart for personalizing data transfers utilized with an audio/video stream. At step 300, the system receives identification information that may be used to identify advertising or other audio/video streams that may be personalized. Step 302 checks if an audio/video stream corresponds to a stream identified by information transferred in step 300. When an audio/video stream corresponds to a stream identified by information transferred n step 300, step 304 checks if a network connection has been established. If a network connection has not been established, step 306 establishes a network connection. Step 308 requests stream information. A server system (not depicted) may utilize stream request information that identifies the requester, such as Internet address, cable system identification information, or other information to access profile information of the user or a group to which the user may be associated with. Stream information is then sent to the client system wherein the information may be tailored to a characteristic or characteristics of the user. Step 310 receives the stream information. The stream information is employed to obtain data transfers and synchronize utilization of data transfers with an audio/video screen as depicted in FIG. 2.

FIGS. 2 and 3 depict steps wherein a check is performed to determine if a network connection has been established. In some embodiments of the invention, the system may employ an 'always connected' architecture such that the aforementioned step of determining if a network connection has been established would not be included as part of the steps of FIGS. 2 and 3. Further, there may be software that attempts to retrieve information a predetermined number of times and after the predetermined number of attempts have been performed, the system may discontinue steps to retrieve information and return to the start of the sequence.

The flowcharts of FIGS. 2 and 3 depict single task threads for simplicity. In actual implementation, multitasking may be employed such that during steps that indicate waiting for a condition, other processes may be performed. Processes shown in the figures may be implemented in hardware, software, or a combination thereof.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

We claim:

1. A method for synchronizing data transmitted over an isochronous network from a data source with an audio/video stream system comprising:
   determining latencies that exist in said isochronous network;
   calculating a time period base upon said latencies in said isochronous network;
   receiving an audio/video stream at a user system;
   requesting said data from said data source over said isochronous network;
   transmitting said data from said data source over said isochronous network to said user system in response to said request for data from said data source at a time that precedes receipt of said audio/video stream at said user system by an amount that is substantially equal to, but not less than, said time period, so that the amount of said data transmitted to said user system is minimized;
   receiving said data at said user system over said isochronous network including a descriptor of when said data may be combined with said audio/video stream;
   obtaining time information from said audio/video stream; and
   combining said data and said audio/video stream at said user system when said time information is in substantial agreement with said descriptor.

2. The method of claim 1 wherein said step of receiving said data further comprises:
   receiving said data on a first isochronous network and receiving said audio/video stream on a second channel or network.

3. The method of claim 1 wherein said step of obtaining time information further comprises:
   checking the value of a time stamp in MPEG data.

4. The method of claim 1 wherein said step of obtaining time information further comprises:
   checking time information contained in a blanking interval.

5. The method of claim 1 wherein said step of requesting said data further comprises:
   checking if said isochronous network connection has been established; and
   if said isochronous network connection has not been established, establishing said isochronous network connection.

6. The method of claim 1 wherein said step of receiving said data further comprises:
   processing said data from said data source.

7. The method of claim 1 wherein said step of requesting said data further comprises:
   providing information identifying a user.

* * * * *